United States Patent
Smith

(10) Patent No.: US 10,907,958 B2
(45) Date of Patent: Feb. 2, 2021

(54) RAILROAD TRACK DEFECT DETECTION APPARATUS AND METHOD

(71) Applicant: Frank J Smith, Long Beach Township, NJ (US)

(72) Inventor: Frank J Smith, Long Beach Township, NJ (US)

( * ) Notice: Subject to any disclaimer, the term of this patent is extended or adjusted under 35 U.S.C. 154(b) by 0 days.

(21) Appl. No.: 16/123,318

(22) Filed: Sep. 6, 2018

(65) Prior Publication Data

US 2020/0103223 A1  Apr. 2, 2020

Related U.S. Application Data

(60) Provisional application No. 62/555,253, filed on Sep. 7, 2017.

(51) Int. Cl.
| | | |
|---|---|---|
| *G01B 11/16* | (2006.01) | |
| *B61K 9/10* | (2006.01) | |
| *B61L 23/04* | (2006.01) | |
| *G01N 21/95* | (2006.01) | |
| *B61L 25/02* | (2006.01) | |

(52) U.S. Cl.
CPC ............... *G01B 11/18* (2013.01); *B61K 9/10* (2013.01); *B61L 23/044* (2013.01); *B61L 25/021* (2013.01); *G01N 21/95* (2013.01); *G01N 2201/088* (2013.01)

(58) Field of Classification Search
CPC ......... G01B 11/18; B61K 9/10; B61L 23/044; B61L 25/021; G01N 21/95; G01N 2201/088
See application file for complete search history.

(56) References Cited

U.S. PATENT DOCUMENTS

| | | | | | |
|---|---|---|---|---|---|
| 4,701,614 | A | * | 10/1987 | Jaeger | G08B 13/186 250/227.14 |
| 5,056,884 | A | * | 10/1991 | Quinlan, Jr. | G01L 1/242 385/13 |
| 5,118,931 | A | | 6/1992 | Udd et al. | |
| 5,330,136 | A | * | 7/1994 | Colbaugh | B61L 1/06 246/122 R |
| 5,462,244 | A | * | 10/1995 | Van Der Hoek | B61L 1/06 246/122 R |

(Continued)

FOREIGN PATENT DOCUMENTS

| | | |
|---|---|---|
| EP | 1000833 A1 | 5/2000 |
| EP | 1582430 A1 | 10/2005 |
| WO | 2012152575 A1 | 11/2012 |

OTHER PUBLICATIONS

Dean Yamasaki, Distributed Strain and Temperature Sensing Using Brillouin Scattering, AFL Global White Paper, 2014, www.aflglobal.com.

*Primary Examiner* — Roy M Punnoose

(57) ABSTRACT

A system and method for detecting and determining the location of (i) defects in railroad track rails and (ii) the presence of cars, trains or vehicles on the rails. A strain sensitive fiber optic cable is continuously bonded to each section of rail, with the cables of adjacent rails being interconnected by non-strain-sensitive fiber optic cable. A detection system provides an optical backscatter sensing function and an optical time domain reflectometry analysis and distance determining function to determine the nature and location of rail anomalies and vehicle presence on the rails.

10 Claims, 9 Drawing Sheets

(56) References Cited

U.S. PATENT DOCUMENTS

| | | | | |
|---|---|---|---|---|
| 5,529,267 | A * | 6/1996 | Giras | B61L 1/06 |
| | | | | 246/120 |
| 5,627,637 | A * | 5/1997 | Kapteyn | G01B 11/18 |
| | | | | 356/32 |
| 5,757,988 | A * | 5/1998 | Lindow | G01F 23/18 |
| | | | | 250/227.16 |
| 7,668,411 | B2 * | 2/2010 | Davies | G01H 9/004 |
| | | | | 385/12 |
| 10,281,300 | B2 * | 5/2019 | Handerek | G01H 9/004 |
| 10,317,256 | B2 * | 6/2019 | Raghavan | G01D 5/35351 |
| 10,416,032 | B2 * | 9/2019 | Jiang | B61L 23/047 |
| 10,444,095 | B2 * | 10/2019 | Glueck | B61K 9/08 |
| 2001/0045495 | A1 | 11/2001 | Olson et al. | |
| 2009/0304322 | A1 * | 12/2009 | Davies | G01H 9/004 |
| | | | | 385/12 |
| 2016/0356661 | A1 * | 12/2016 | Glueck | B61K 9/08 |
| 2017/0115138 | A1 * | 4/2017 | Sternklar | G01M 11/3109 |
| 2018/0094952 | A1 * | 4/2018 | Handerek | G01M 11/3118 |
| 2018/0267201 | A1 * | 9/2018 | Lewis | B61L 1/166 |
| 2018/0299301 | A1 * | 10/2018 | Raghavan | G01D 5/35351 |
| 2019/0250015 | A1 * | 8/2019 | Sternklar | G01D 5/35361 |

* cited by examiner

RAILROAD TRACK DEFECT DETECTION APPARATUS AND METHOD

CROSS-REFERENCE TO RELATED APPLICATION

This application claims the benefit of U.S. Provisional Application Ser. No. 62/555,253 filed Sep. 7, 2017 and entitled Rail Break and Train Location Detection Method Using Fiber Optics.

BACKGROUND OF THE INVENTION

This invention relates to an apparatus and method for detecting defects in the rails of a railroad track and providing location and other information respecting the same.

A common cause of train derailments is a discontinuity in a rail, frequently due to shifting of a rail section relative to an adjacent section, or a break in the rail. While various methods exist for detecting breaks in rails, no equipment or method exists for remotely and reliably detecting incipient rail problems and monitoring rail changes due to environmental and operational factors.

Train rails are mounted on and secured to cross-ties which rest on a bed of ballast, usually crushed stone or the like which helps to prevent the ties from moving and assists in water drainage. The ballast (or sub-ballast) rests on a substrate of soil. The ties are typically made of wood or concrete. Adjacent ends of rail sections are joined together with steel fishplates, leaving a small gap for thermal expansion and contraction.

The alignment between adjacent rail sections may change due to environmental factors, such as settling of the substrate, and vibration or pressure due to trains running on the track. When adjacent rails become sufficiently misaligned, the rail continuity may be disturbed to the extent of causing a train derailment, even if the rails are not broken.

Since the rails of a track consist of metal sections joined together by metal fishplates, there is normally electrical conductivity throughout the entire length of track, which is interrupted when there is a break in the track. It is therefore known to pass a low voltage current through blocks of track and generate a warning signal when there is a break in the block.

Rail break detection is only successful if the rail break is fully parted and not located over a metal tie plate. There is no warning prior to the actual breaking of the rail. The train location detection is limited to knowing that the train is somewhere in the block, so that with long blocks visual inspection is needed to locate the break. A conductivity detection system cannot detect gauge separation or other rail attachment problems.

Rail break detection is also being done by means of rail inspection cars that travel the tracks and search for rail damage, deterioration, misalignment and other conditions. This approach does not provide for continuous monitoring of the rails and results of a survey may not be reported immediately. Rail inspection cars do not make any direct observation of change in strain in the rail.

Specially constructed fiber optic sensor cables have been manufactured so as to be sensitive to changes in the cable due to external stress or temperature variation. The technology involved in one type of fiber optic sensor cable is described in an article by Dean Yamasaki entitled Distributed Strain and Temperature Sensing Using Brillouin Scattering, 2014, published online as a white paper at www.af-global.com. A fiber optic microbending strain sensor is described in U.S. Pat. No. 5,118,931 to Udd et al.

Attempts have been made to provide a monitoring system for train rails using fiber optic cables as sensors. For example, U.S. Patent Application 2001/0045495 of Olson et al. describes a monitoring system in which a plurality of monitoring assemblies comprising fiber optic sensing fibers is buried in the substrate adjacent the track. This system, however, requires the burial and interconnection of many assemblies for any typical run of track, with associated maintenance issues.

U.S. Pat. No. 5,330,136 to Colbaugh, Entitled Railway Coded Track Circuit Apparatus and Method Utilizing Fiber Optic Sensing, describes a fiber optic sensor cable having sensitized sections, disposed in a longitudinal groove in each rail section to detect changes in the groove resulting from forces applied to the rail. However, such an arrangement requires precise alignment and contact between the cable and the interior walls of the groove, which is not practicable in the outside environment where trains operate.

U.S. Pat. No. 5,529,267 to Giras et al. utilizes multiple fiber optic sensors placed beneath and alongside the rail to sense compressive (due to the weight of a train) and lateral strain in the rail. This system requires multiple sensors with associated undue complexity and maintenance requirements.

An object of the present invention is to provide a low maintenance fiber optic-based system for reliably and continuously detecting undesirable variations in railroad tracks, without discrete strain gauge devices.

SUMMARY OF THE INVENTION

As herein described, a length of strain sensitive fiber optic cable is bonded to one side of each rail in a section of interconnected rails of a railroad track. A light source transmits a modulated optical signal through the cable lengths. A device providing a backscatter detection function communicates with the cable lengths and detects backscatter resulting from deformation of one or more of the cable lengths due to passage of a train or similar moving object along the track. A data processing unit is coupled to the device providing the backscatter detection function for generating information relating to the deformation.

IN THE DRAWING

Figure 5A:
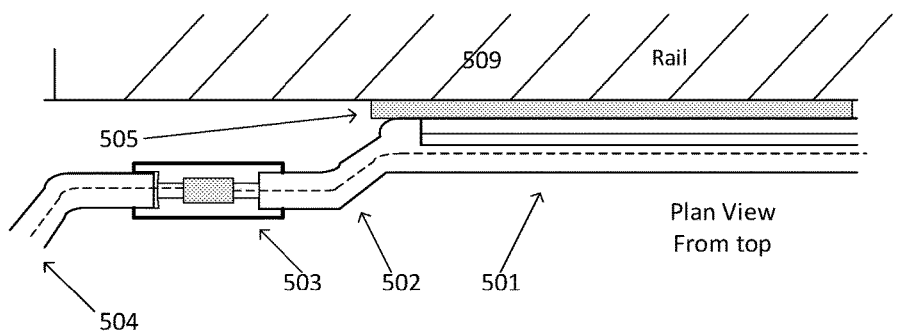
Figure 5B:
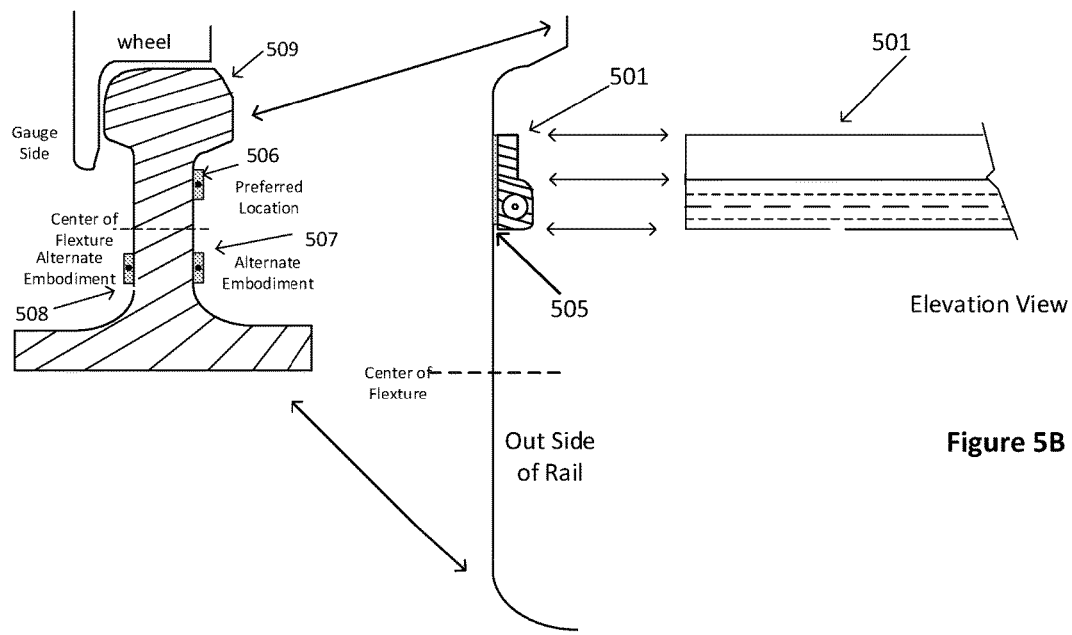

FIG. 5, comprising FIGS. 5A and 5B, is an end cross-sectional and a partial side view of a rail, showing detail of the mounting of the fiber optic cable to a rail. FIG. 5A is a top plan view of a section of rail with fiber optic cable adhered thereto, and FIG. 5B is a cross-sectional end view and an elevation view thereof.

Figure 6:
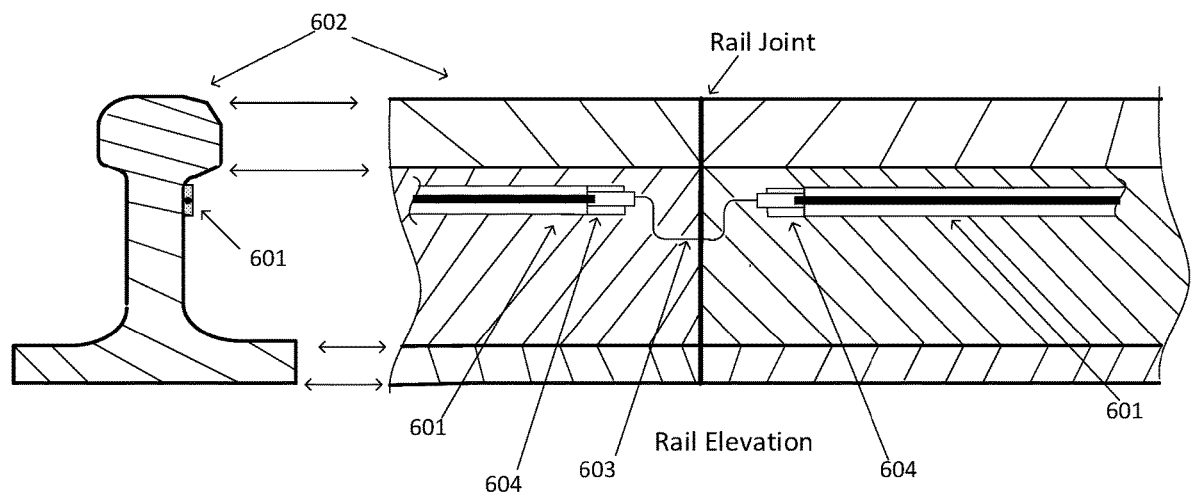

FIG. 6 is an end cross-sectional and a partial side view of a rail, showing the manner in which fiber optic cable segments are linked where rails meet.

Figure 7:
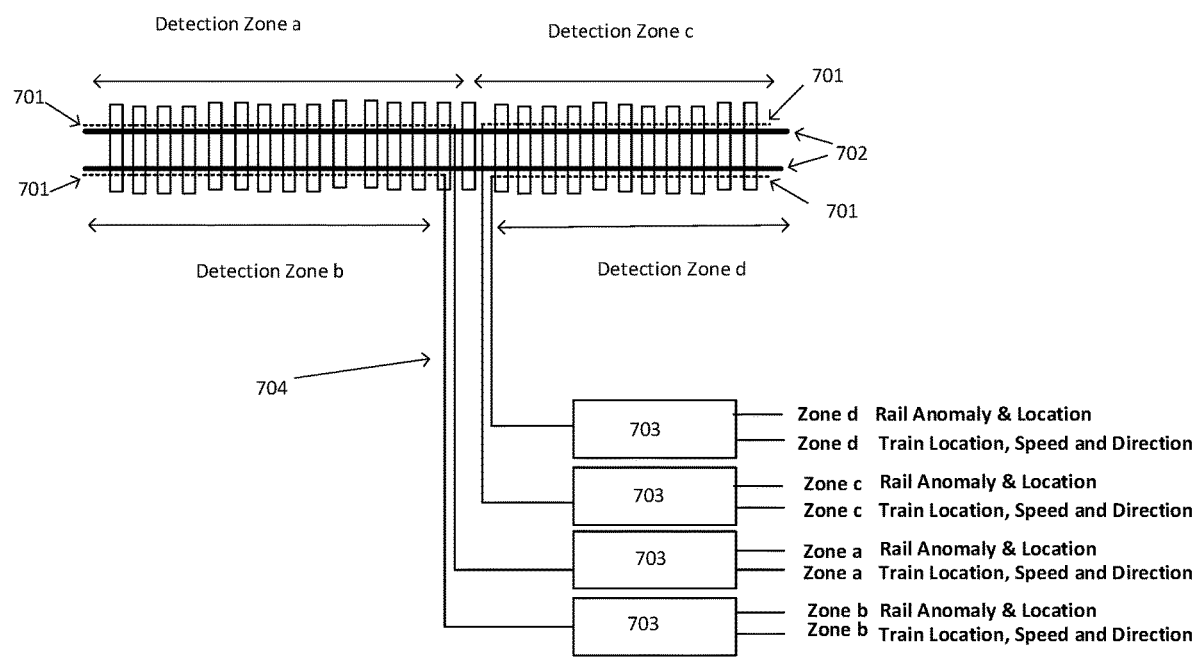

FIG. 7 is a schematic functional block diagram showing the application of the arrangement of the invention to multiple detection zones.

Figure 8:
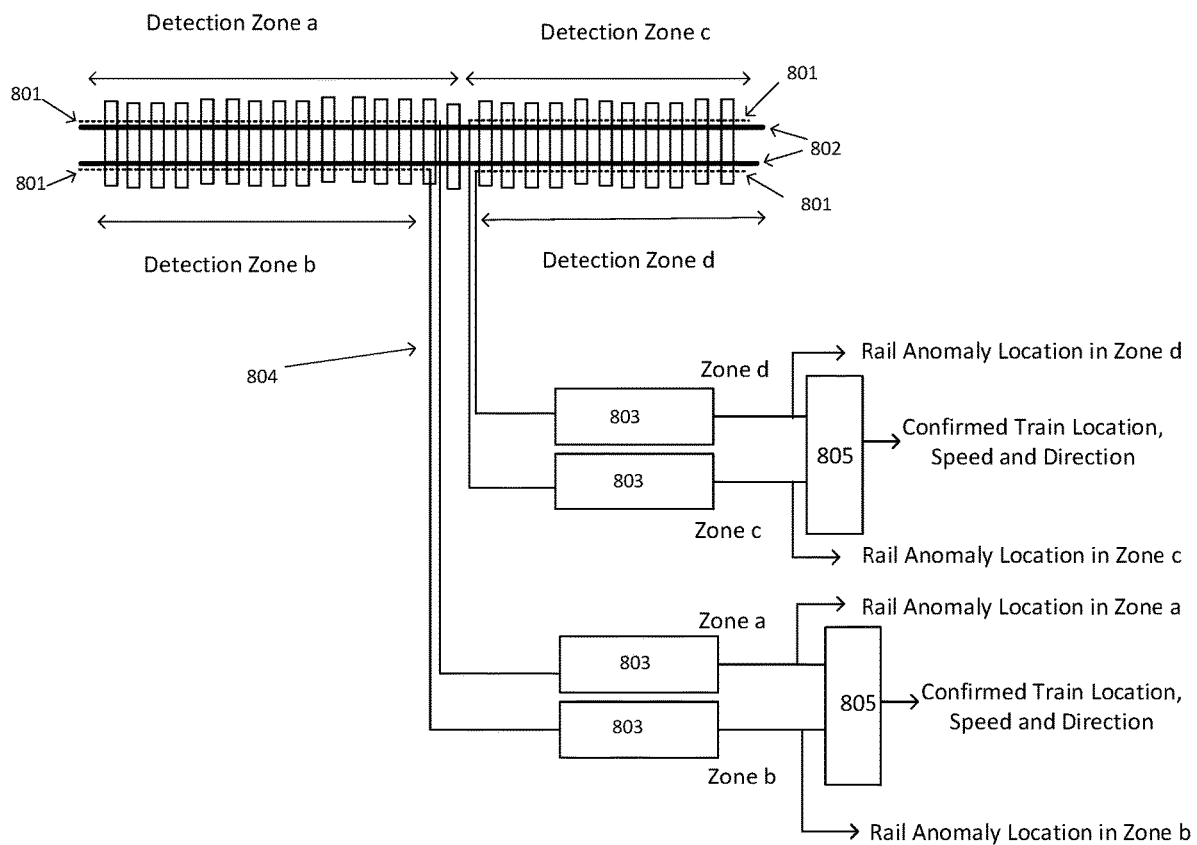

FIG. 8 is a schematic functional block diagram showing functions according to the preferred embodiment to provide train location, speed and direction.

Figure 9A:
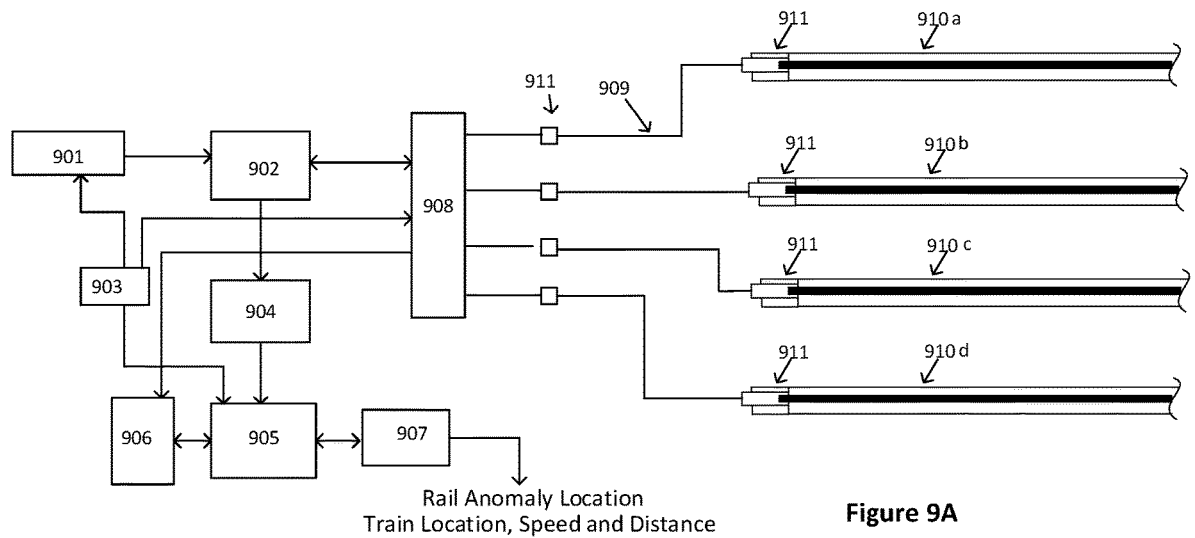

FIG. 9A is a functional block diagram according to an alternate embodiment of the invention, employing optical multiplexing.

Figure 9B:
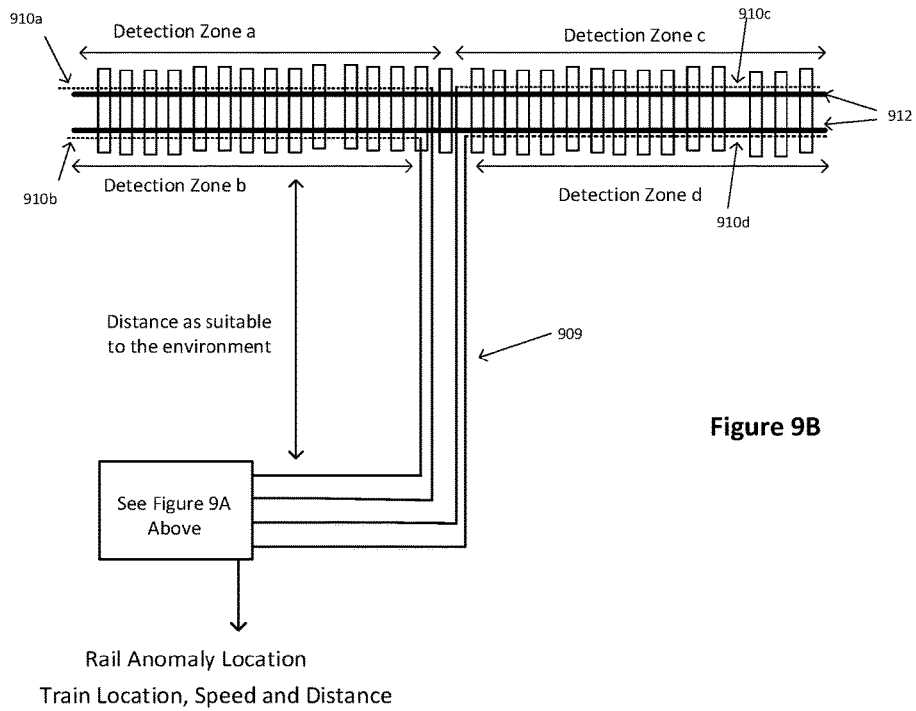

FIG. 9B is a function schematic diagram according to a further embodiment of the invention, employing an optical multiplexer.

DETAILED DESCRIPTION

Figure 1A:
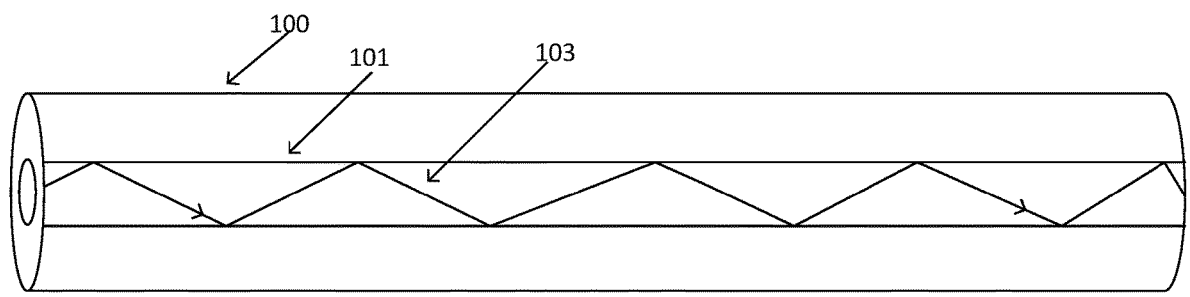
FIG. 1A shows a fiber optic cable, illustrating the manner in which light propagates through it.
Figure 1B:
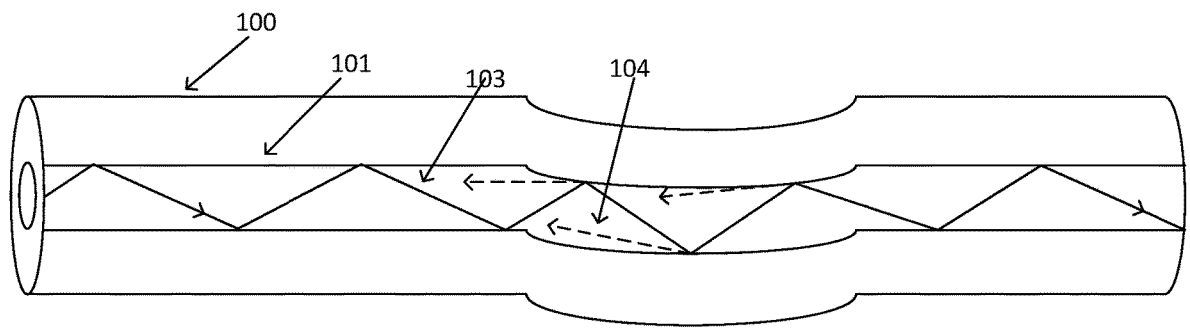
FIG. 1B shows the cable of FIG. 1A, illustrating the backscatter that occurs when the cable is deformed.

FIG. 1 illustrates the transmission of light through a fiber optic strand and the creation of backscatter as a result of bending of the fiber. The fiber optic strand 100 has an inner core 101 and an outer optical sheath. At the interface of the core and the sheath there is a change in the index of refraction. If the fiber is straight (FIG. 1A) the light pulse 103, entering from the left, passes through the inner core with little loss or disturbance. However, if the fiber is bent (FIG. 1B), the light pulse reflects off the interface at a nonsymmetrical angle and gives rise to backscatter 104.

Figure 2:
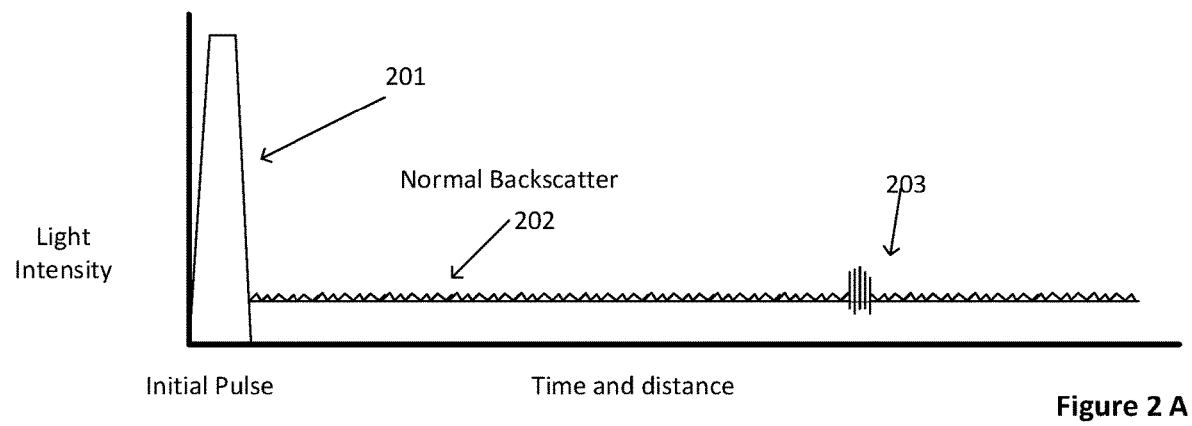
FIGS. 2A through 2C illustrate different backscatter patterns.
Figure 2:
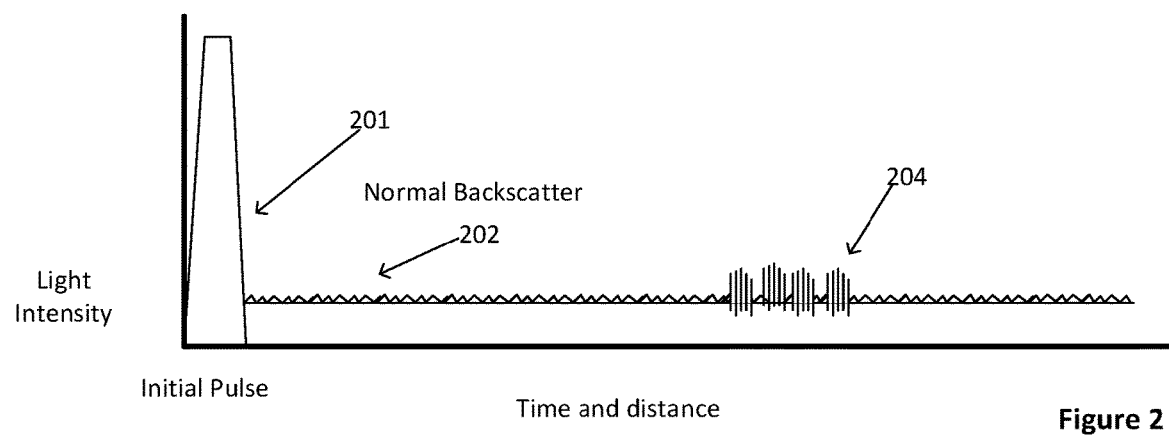
Figure 2:
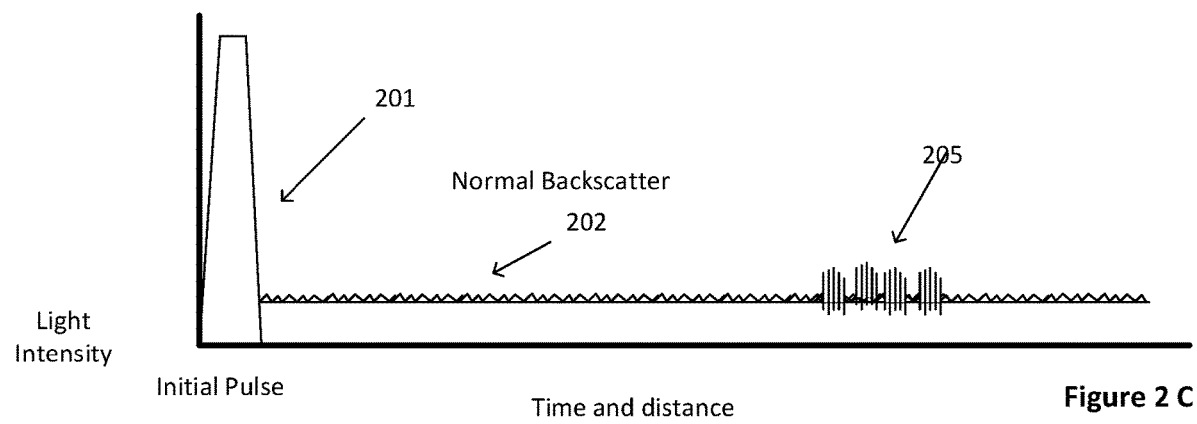

FIG. 2 illustrates the patterns that the backscatter can make in relation to time and distance. In all three examples there is an initial pulse of light 201 that initiates the detection process. This pulse is at time zero and is at zero distance from the end of the fiber optic cable. The pulse travels to the right down the length of the fiber optic cable. As it travels down the fiber at a fixed fraction of the speed of light, the cable produces a low level of normal backscatter 202 due to inherent microfractures in the glass fiber. When the pulse 201 comes to a bend in the cable, there is a sharp increase 203 in the intensity of the backscatter. The exact location of the backscatter 203 can be calculated based on the speed of light in the fiber and the time between the initial pulse and the time of the backscatter return.

The intensity of the backscatter is directly related to the degree of bending of the fiber. A narrow backscatter 203 that remains stationary may indicate a rail anomaly such as a crack or loose bolt.

A cluster 204 of backscatter returns may indicate the presence of a train, car or vehicle. The length (duration) of the cluster will indicate the length of the train. If the cluster 205 moves with time, the speed and direction of the train can be determined.

Figure 3:
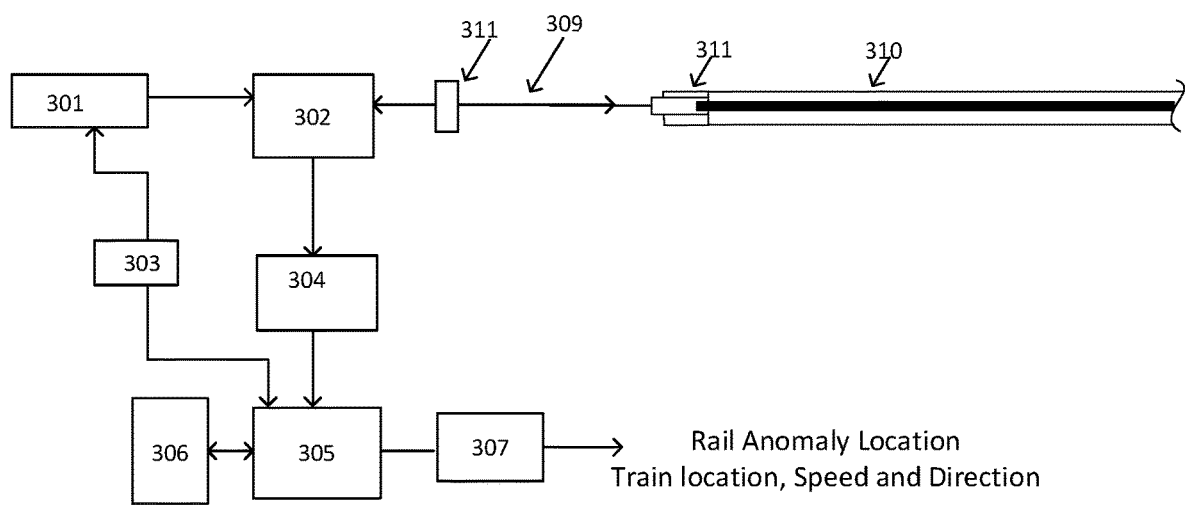
FIG. 3 is a functional block diagram showing the function for creating a data file from backscatter events, according to a preferred embodiment of the invention.

FIG. 3 illustrates the basic functions needed to create and detect backscatter. Blocks 301 through 305 perform the functions of part of a standard optical time domain reflectometer (OTDR). Block 301 is a laser that generates an optical pulse. Block 302 is an optical filter that separates the outgoing powerful light pulse from the incoming and much weaker backscatter light.

Block 303 provides system timing and distance measurement. Block 304 is a detector that converts backscatter into electrical pulses. Block 305 compares the intensity and timing of the backscatter to create a data file of backscatter events.

Block 306 maintains a record of the current and previous observations of the backscatter profile along the rail. The previous data files can be aggregated into a composite file representing normal and known backscatter conditions.

Block 307 communicates the data file to the train control computer. Block 310 is the fiber optic strain sensing cable. Block 311 is a fiber optic cable connector. There is a nonsensitive fiber optic cable 309 that connects the OTDR to the rail attached strain sensitive cable.

Figure 4:
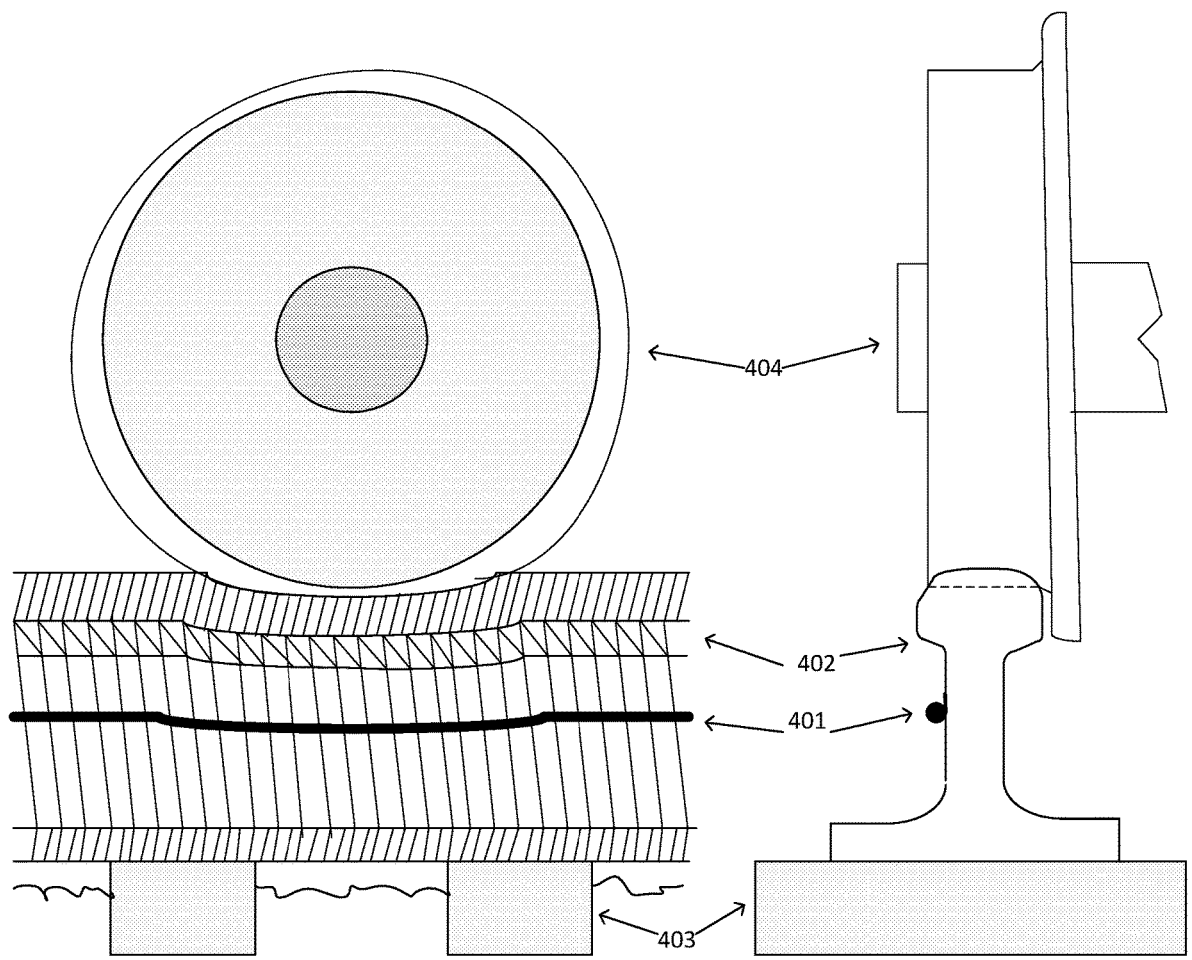
FIG. 4 is an end view and partial side view of a rail, illustrating how strain in a rail deforms the adjacent optical fiber in the preferred embodiment.

As shown in FIG. 4, when a load, such as a locomotive wheel 404, rolls along the rail there is a slight bend (microbend) 402 in the rail, which is supported by the ties 403. The degree of bending or strain is determined by the modulus of elasticity, a structural parameter which is a measure of the stiffness of the rail. This modulus is a constant for a given weight and structure of rail. The modulus or stiffness will be deteriorated by the presence of anomalies such as rail cracks. The movement of a locomotive or other heavy car along the rail applies a moving load along the entire length of the rail. The load is constant, thus allowing comparison of the strain effects on each portion of the rail to the portion just passed. The stiffness of the roadbed or substrate under the rails may also contribute to the creation of backscatter, but over a much wider distance.

FIG. 5 illustrates the attachment of the optical fiber 501 to the side of the rail 509. The fiber is firmly attached to the rail by welding, gluing, bonding, clamping or whatever method provides a tight and continuous attachment 505. The preferred location is 506. Alternative attachment locations are 507 and 508.

The fiber end 502 is bent away from the rail to permit the attachment of a fiber optic connector 503. A non-strain-sensitive fiber optic cable 504 connects the end of the sensing fiber to the optical time domain reflectometry analysis and distance determining function and analytical equipment shown in FIG. 3. The non-strain-sensitive fiber cable 504 can be as long necessary. The fiber 501 is enclosed in a protective jacket 502 that may be metallic or of similar materials to provide suitable protection from the environmental conditions common on railroad tracks.

The structure comprising the fiber cable 501 is designed to provide a convenient means for secure attachment to the outside of the rail 509. The structure comprising the cable will effectively communicate rail strain from its exterior to the fiber. The structure of the cable is such as to facilitate field cutting of the cable and the attachment of a suitable optical connector 503.

FIG. 6 illustrates the interconnection of sections of fiber optic strain sensitive cable by non-strain-sensitive cable. The strain sensitive cable 601 is attached to the rail 602 in the preferred location 506 (FIG. 5). When the cable 601 must be interrupted, as in the case of a weld in the rails, the adjacent ends of the cables are each fitted with an optical connector 604. A non-strain-sensitive fiber optic jumper 603 is installed between the connectors.

Even though the strain sensitive cable does not pass over the weld in the rail, a flaw in the weld will be detected. If the weld fails, small cracks will develop in the weld material between the rail ends. There will be a concentration of strain around the weld that will be visible by the detection system as a local and stationary increase in backscatter.

FIG. 7 illustrates a preferred application of the fiber optic rail detection arrangement to multiple zones. Four strain sensing fiber optic cables 701 are bonded to the rails 702 to form four detection zones. Each cable 701 is coupled to a separate optical time domain reflectometry analysis and distance determining device performing function 703 as illustrated in FIG. 3.

Devices providing the function 703 can be located at any convenient distance from the track and connected by means of the non-strain-sensitive fiber optic cables 704. Each such device performing function 703 monitors the backscatter and observes the strain in its dedicated zone. Each such device provides individual reports of conditions on the track zone being monitored.

Each device performing the function 703 will report any anomalies observed in the monitored zone that may indicate cracks in the rail, loose rail attachment hardware, loose bolts, or other stationary defects. The data transmitted from that device will be repeated as each train passes through the detection zone.

A comparison of current data results with previous results will reveal changes in anomalies that may indicate a deteriorating condition that may, if not repaired, progress to a broken rail.

Each device performing function 703 also reports the location, speed and direction of any and all trains, vehicles or cars in the monitored zone. Such device may also identify concentrations of rail strain within the signal corresponding to a train that result from wheel and bearing damage. These strain concentrations will move in reception time with the train.

FIG. 8 illustrates use of the arrangement shown in FIG. 7 to provide highly reliable determination of train location, speed and direction. Each pair of fibers for zones a and b, and c and d, detect the same train twice. Each detection is done and processed independently by each of the devices performing functions 803. The results are compared to each other in the real time analytical comparator 805. If the results match, then the train location is known to a high degree of certainty.

When a train or other vehicle is not present, the comparator 805 will compare the normal backscatter 202 from each rail as described with reference to FIG. 2. If the normal level of backscatter is not similar in each of the coupled devices performing function 803 for corresponding zones, then there is a potential equipment failure; so that the detection system is self-monitoring.

FIG. 9 illustrates an alternative configuration of the optical time domain reflectometry analysis and distance determining equipment. This is the same technology as described with reference to FIG. 3, except that an optical multiplexer 908 is included. Elements 901 to 905, 907 and 909 perform the same functions as elements 301 to 305, 307 and 309 respectively. Each of elements 910*a* to 910*d* performs the same function as element 310. Each of elements 911 performs the same function as element 311. The speed of light in the fiber optic cable is many orders of magnitude faster than the speed of a train on the rails. The same optical time domain reflectometry analysis and distance determining detection equipment can therefore be used to monitor several zones using sequential polling. The optical multiplexor 908 sequentially connects each strain-sensitive cable 910 to the OTDR. The observations are transferred to the system memory 906 with tags identifying the zone covered.

I claim:

1. Apparatus for detecting defects in a section of railroad track having a plurality of interconnected rails, comprising:
   a length of strain sensitive fiber optic cable bonded to one side of each of said rails, sections of fiber optic cable which are substantially less strain sensitive than said strain sensitive cable optically interconnecting adjacent ends of said strain sensitive cable lengths;
   a light source for transmitting a modulated optical signal through said cable lengths and sections;
   backscatter detection means communicating with said cable lengths for detecting backscatter resulting from deformation of one or more of said cable lengths due to passage of a train or similar moving object along said track section; and
   data processing means coupled to said backscatter detection means for generating information relating to said deformation.

2. Apparatus according to claim 1, wherein said data processing means includes means for comparing backscatter signals received from successive passages of a train or similar moving object over said track section, to detect one or more rail defects.

3. Apparatus according to claim 2, wherein said data processing means includes means for comparing backscatter signals received from successive passages of a train or similar moving object over said track section, to determine the location of each of said rail defects.

4. Apparatus according to claim 3, wherein said data processing means includes means for comparing backscatter signals received from successive passages of a train or similar moving object over said track section, to determine the speed and direction of travel of one or more trains or other moving objects traversing said track section.

5. The apparatus according to claim 1, wherein said strain sensitive fiber optic cable is bonded by welding, gluing, or clamping.

6. A process for detecting defects in a section of railroad track having a plurality of interconnected rails, comprising the steps of:
   bonding a length of strain sensitive fiber optic cable to a side of each of said rails;
   optically interconnecting adjacent ends of said strain sensitive cable lengths with sections of an optical cable which is substantially less strain sensitive;
   transmitting a modulated optical signal through said cable lengths and sections;
   detecting backscatter resulting from deformation of said cable due to passage of a train or similar moving object along said track section; and
   generating information relating to said deformation.

7. The process according to claim 6, comprising the additional step of comparing backscatter signals received from successive passages of a train or similar moving object over said track section, to detect one or more rail defects.

8. The process according to claim 7, comprising the additional step of comparing backscatter signals received from successive passages of a train or similar moving object over said track section, to determine the location of each of said rail defects.

9. The process of claim 8, comprising the additional step of comparing backscatter signals received from successive passages of a train or similar moving object over said track section, to determine the speed and direction of travel of one or more trains or other moving objects traversing said track section.

10. The process according to claim 6, wherein said bonding step comprises welding, gluing, or clamping.

* * * * *